United States Patent
Tseng et al.

(10) Patent No.: US 8,279,265 B2
(45) Date of Patent: Oct. 2, 2012

(54) AUTOMATIC CAPTURING METHOD OF A PANORAMIC IMAGE FOR A DIGITAL CAMERA

(75) Inventors: Chia-Chun Tseng, Hsinchu (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 783 days.

(21) Appl. No.: 12/472,064

(22) Filed: May 26, 2009

(65) Prior Publication Data

US 2010/0194852 A1  Aug. 5, 2010

(30) Foreign Application Priority Data

Feb. 4, 2009  (TW) ................ 98103570 A (51) Int. Cl.
*H04N 7/00* (2011.01)
(52) U.S. Cl. ............................ 348/36; 348/37
(58) Field of Classification Search ............ 348/36, 348/208.99, 231.99, 218.1, 37; 382/284
See application file for complete search history.

(56) References Cited

U.S. PATENT DOCUMENTS

| | | | |
|---|---|---|---|
| 2008/0074506 A1* | 3/2008 | Oh et al. | 348/218.1 |
| 2008/0158342 A1* | 7/2008 | Jeong et al. | 348/36 |
| 2008/0180550 A1* | 7/2008 | Gulliksson | 348/231.99 |
| 2008/0252717 A1* | 10/2008 | Moon et al. | 348/36 |
| 2008/0298718 A1* | 12/2008 | Liu et al. | 382/284 |
| 2009/0058990 A1* | 3/2009 | Kim et al. | 348/36 |
| 2009/0153685 A1* | 6/2009 | Son et al. | 348/208.99 |

* cited by examiner

*Primary Examiner* — Le H Luu (74) *Attorney, Agent, or Firm* — Morris Manning & Martin LLP; Tim Tingkang Xia, Esq.

(57) ABSTRACT

An automatic capturing method of a panoramic image for a digital camera panoramic image is presented. In the method, a motion vector value of an alignment image selected from a first image captured by the digital camera in a real-time image is continuously tracked, calculated, and accumulated to obtain an accumulated motion vector value. When the accumulated motion vector value reaches a preset threshold value, the digital camera is automatically driven to capture a second image, so as to stitch and blend the first image and the second image into a panoramic image. Through the automatic image capture mode, operations for capturing the panoramic image are simplified.

4 Claims, 10 Drawing Sheets

AUTOMATIC CAPTURING METHOD OF A PANORAMIC IMAGE FOR A DIGITAL CAMERA

CROSS-REFERENCE TO RELATED APPLICATIONS

This non-provisional application claims priority under 35 U.S.C. §119(a) on Patent Application No(s). 098103570 filed in Taiwan, R.O.C. on Feb. 4, 2009 the entire contents of which are hereby incorporated by reference.

BACKGROUND OF THE INVENTION

1. Field of the Invention

The present invention relates to a panorama photography method, and more particularly to a method for controlling a digital camera to automatically pick up a panoramic image.

2. Related Art

A panoramic image is used to present a wide field of view by simulating a scene of approximately 160° that can be perceived by human eyes, while an ordinary size image shows a region that is cut from a scene. It can be seen by comparison that, the ordinary image highlights the certain region of interest to the human eyes, and the panoramic image enables the viewer to experience the atmosphere at that time. As the panoramic image is fabricated by stitching and blending a plurality of images of the same specification that is picked up from the same scene, the joining region among the images to be joined is one of the key points for obtaining the panoramic image.

In the prior art, two methods for capturing a panoramic image exist. For one method, a user captures a plurality of images by moving a digital camera in a manual manner (in a bare-handed manner or through a stand), then inputs the captured images into a computer, and joins the images by using an image processing software, thus generating a panoramic image. However, this method is quite difficult for ordinary users. On one hand, during capturing, professional photographing skills are required, otherwise the difficulty of the subsequent image-joining process is increased or the effect of image joining is poor. On the other hand, the complex image software needs to be operated for stitching and blending the images.

For the other simple method, an assistant alignment image is displayed on a display screen of the digital camera, so as to assist the user to fabricate the panoramic image. However, in this method, the user needs to independently overlap the alignment image and the scene. The overlapping process requires the user to have an ability in alignment, as the error invisible to the human eyes may cause that the image is not selected from the optimal alignment position, and the generated alignment error may further affect the result of the subsequent image-joining process. Even if the user perfectly overlaps the alignment image and the scene, the alignment may still fail at the instant when the digital camera shakes due to the action of depressing the shutter during image capturing, resulting in the failure to capture the panoramic image.

SUMMARY OF THE INVENTION

In the prior art, when the assistant alignment image is used, the user must independently overlap the alignment image and the scene. Thus, in order to solve the problem of failing to capture the panoramic image due to handshake or an error invisible to the human eyes, the present invention is an automatic panoramic image capturing method of a digital camera.

The automatic panoramic image capturing method of a digital camera according to the present invention comprises the following steps: selecting a region from a captured first image and setting the region to an alignment image; continuously tracking, calculating and accumulating a motion vector value of the alignment image in a real-time image to obtain an accumulated motion vector value; driving the digital camera to automatically obtain a second image if the accumulated motion vector value reaches a preset threshold value; and stitching and blending the first image and the second image to obtain a panoramic image.

Through the automatic panoramic image capturing method of a digital camera according to the present invention, operations for capturing the panoramic image can be simplified. Through the automatic image capture mode, the user does not need to manually depress the shutter, thus alleviating the problem of failing to capture the panoramic image due to handshake.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

An automatic capturing method of a panoramic image for a digital camera. A panoramic image of the present invention may be built in a storage device of an electronic device through software or firmware programs, and realized by a processor of the electronic device by executing the built-in software or firmware programs in combination with an image pickup function. Here, the electronic device may be a computer having the image pickup function, a mobile phone having the image pickup function, a personal digital assistant (PDA) having the image pickup function, or a digital camera. In the following detailed description of the present invention, the digital camera is described as the most preferred embodiment of the present invention. However, the accompanying drawings are used for reference and description only, and it is not intended to limit the present invention to the above electronic devices.

In this embodiment, a moving distance of an alignment image in a real-time image is continuously tracked and calculated, and accumulated to obtain an accumulated motion vector value. Then, the accumulated motion vector value is compared with a preset threshold value, so as to determine whether to automatically drive the digital camera to capture the second image, and stitch and blend the first image and the second image to obtain a panoramic image or not.

Figure 1:
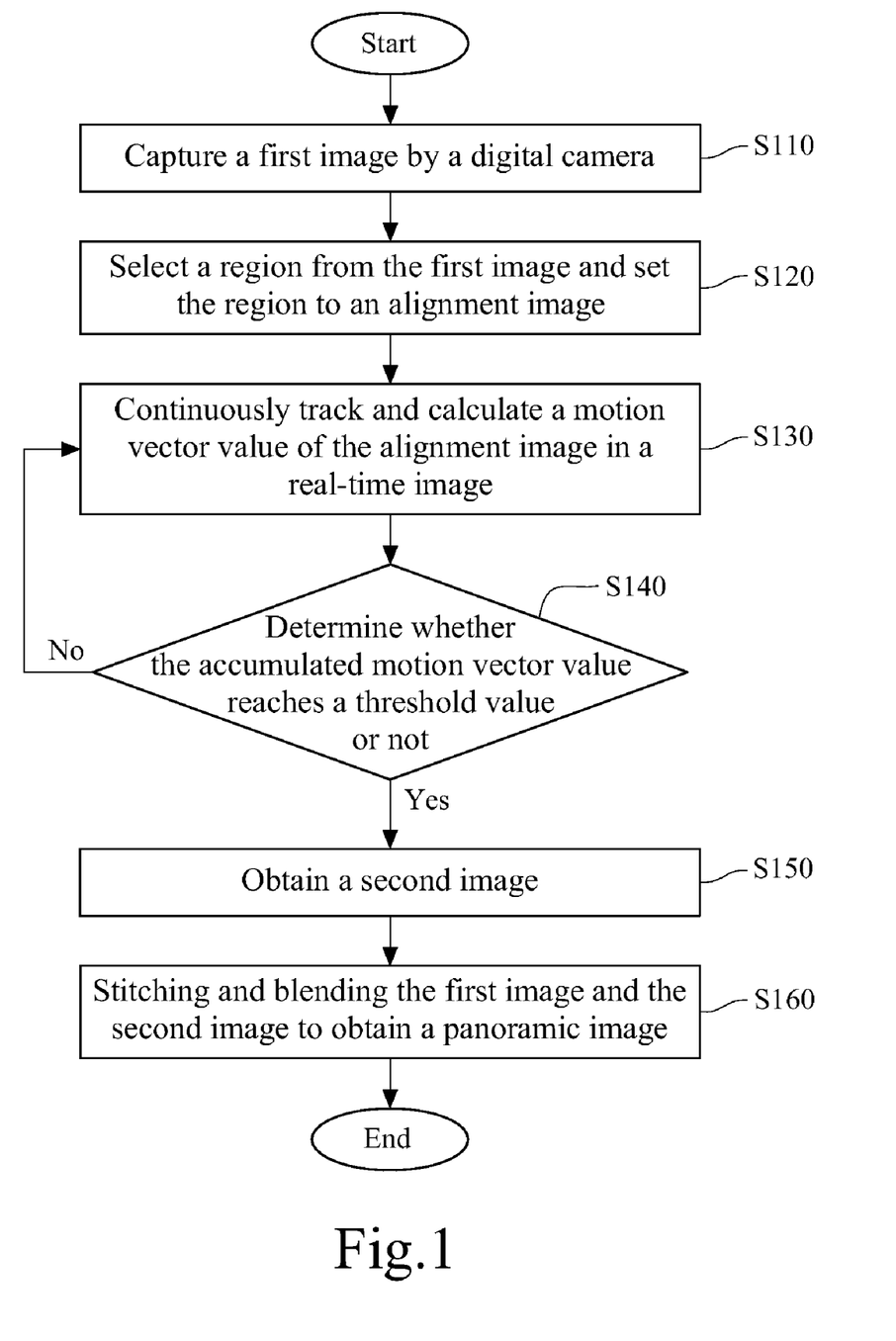
FIG. 1 is a flow chart of an automatic panoramic image capturing method of a digital camera according to an embodiment of the present invention.

FIG. 1 is a flow chart of the automatic panoramic image capturing method of the digital camera according to this embodiment. The method comprises the following steps.

Figure 2:
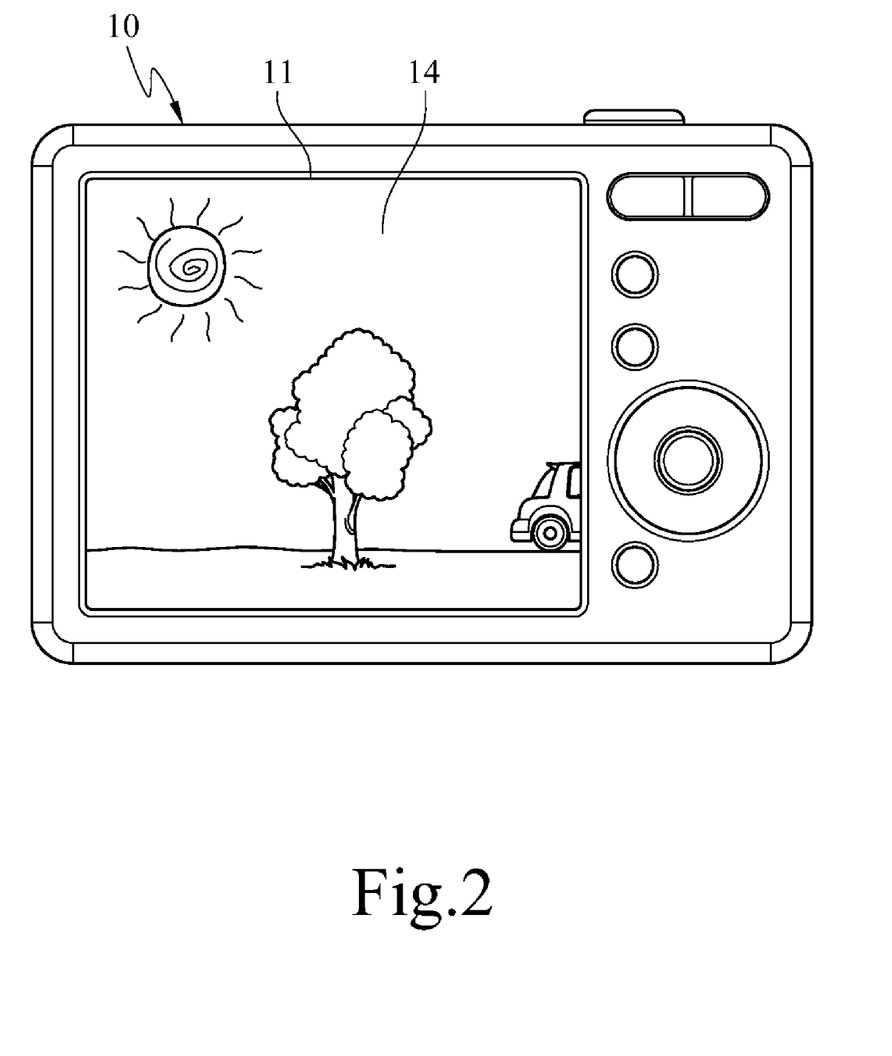
FIG. 2 is a schematic view of a first image according to the embodiment of the present invention.

In Step S110, a digital camera 10 captures and stores a first image 14 (referring to FIG. 2).

In Step S120, a region is selected from the first image 14 and is set to an alignment image 15.

In Step S130, a real-time image 16 is obtained and displayed on a display screen 11. As the digital camera 10 is not moved, the scene of the real-time image 16 on the display screen 11 is the same as that of the first image 14. Next, the digital camera 10 is moved, such that the alignment image 15 in the real-time image 16 experience a displacement along with the rotation of the digital camera 10. During the rotation, the digital camera 10 starts to continuously track and calculate a motion vector value of the alignment image 15 in the real-time image 16 and the result of accumulated calls an accumulated motion vector value.

In Step S140, it is determined whether the accumulated motion vector value reaches a preset threshold value or not.

In Step S150, when the accumulated motion vector value reaches the preset threshold value, the digital camera 10 immediately captures a second image 17.

In Step S160, stitching and blending the first image 14 and the second image 17 are to obtain a panoramic image 13.

The preset threshold value is a difference between a maximum width of the first image and a width of the alignment image.

Figure 3:
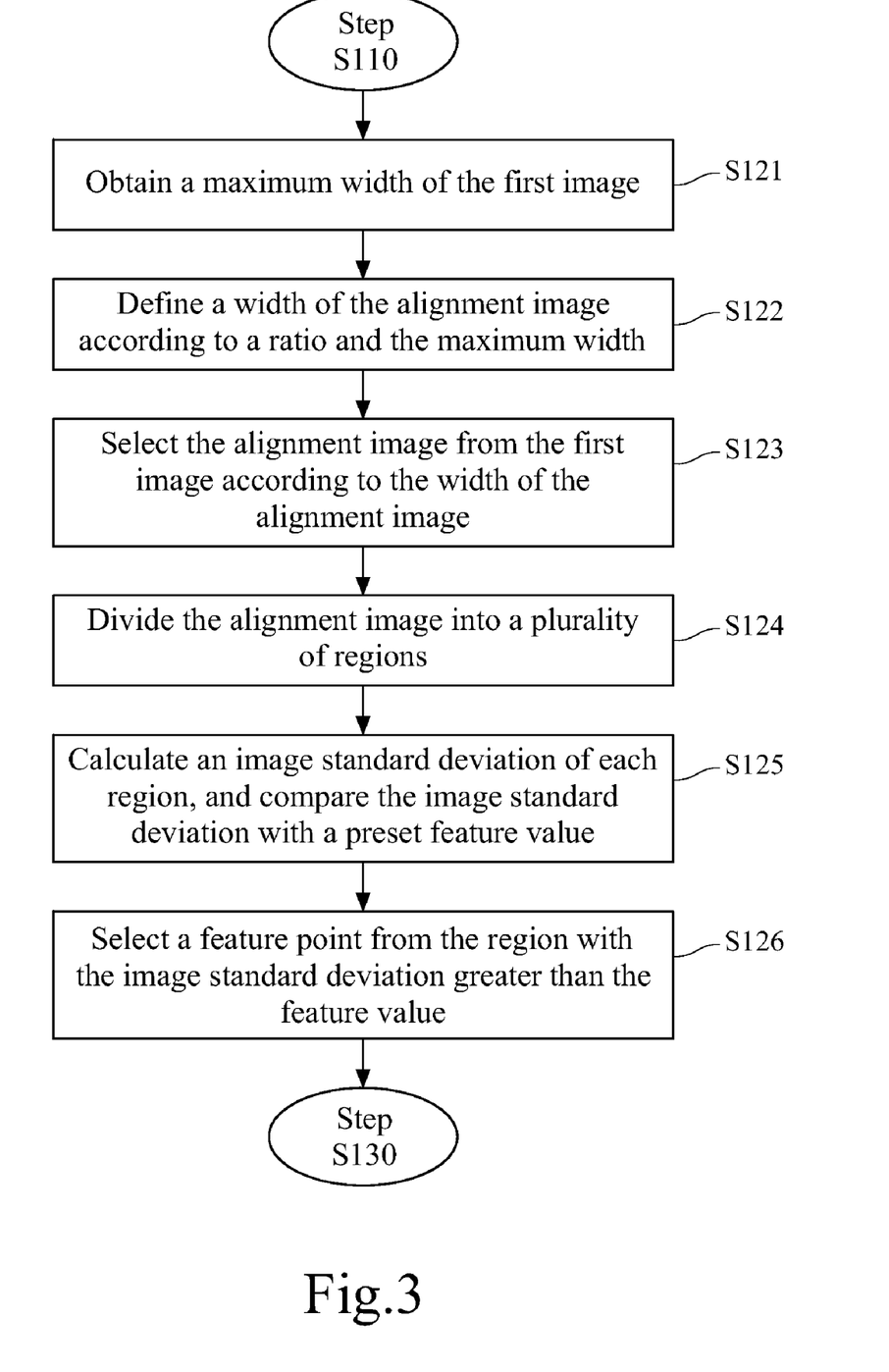
FIG. 3 is a flow chart of the step of selecting a region from the first image and setting the region to an alignment image according to the embodiment of the present invention.

Referring to FIG. 3, in a preferred method embodiment, Step S120 further comprises the following steps.

In Step S121, when capturing the first image 14, the digital camera 10 also obtains the maximum width of the first image 14.

In Step S122, the width of the alignment image 15 is defined according to a ratio preset in the digital camera 10 and the maximum width.

Figure 4:
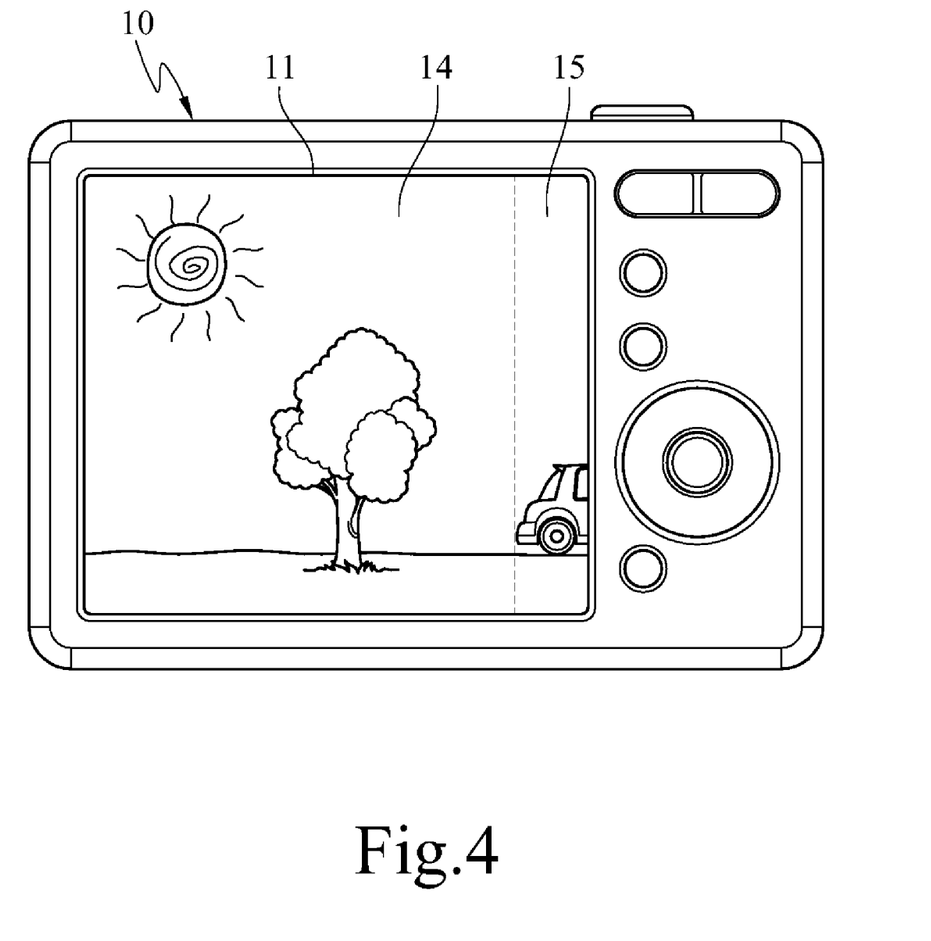
FIG. 4 is a schematic view of the step of selecting the region from the first image and setting the region to the alignment image according to the embodiment of the present invention.

In Step S123, the alignment image 15 is selected from the first image 14 according to the width of the alignment image 15 (referring to FIG. 4).

Figure 5:
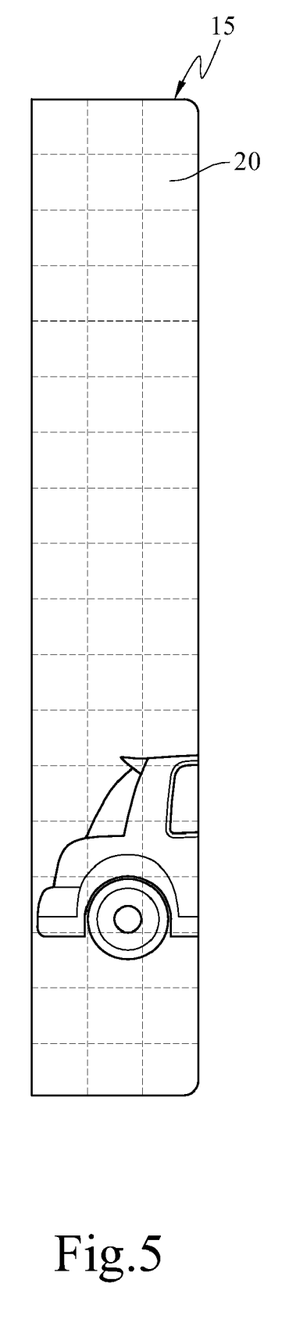
FIG. 5 is a schematic view of the step of dividing the alignment image into a plurality of regions according to the embodiment of the present invention.

In Step S124, the alignment image 15 is equally divided into a plurality of regions 20 (referring to FIG. 5).

In Step S125, an image standard deviation of each region 20 is calculated, and is compared with a preset feature value, in which if the image standard deviation of a region is greater than the preset feature value, it represents that at least one feature point exists in the region.

Figure 6:
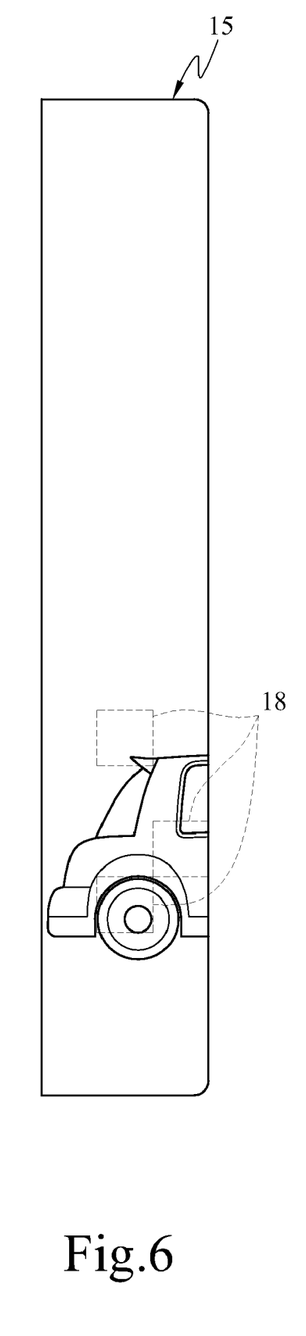
FIG. 6 is a schematic view of a feature point of the alignment image according to the embodiment of the present invention.

In Step S126, a feature point 18 is selected from the region 20 with the image standard deviation greater than the feature value (referring to FIG. 6).

For example, if the first image 14 has a pixel size of 800*600 and the preset ratio is 20%, the width of the alignment image 15 is calculated by using the maximum width of 800 of the first image 14 and the ratio of 20%, so the width of the alignment image 15 is 160, and the pixel size of the alignment image 15 is 160*600. The preset ratio is set for preventing the situation that when the user changes the size of the first image 14, the alignment image 15 is much larger than the first image 14, causing that the range of the stitched and blended panoramic image is too small, or the alignment image 15 is much smaller than the first image 14, causing that it is difficult to track the alignment image 15 in the real-time image 16. Therefore, the size of the alignment image 15 should vary with the size of the first image 14.

Figure 7:
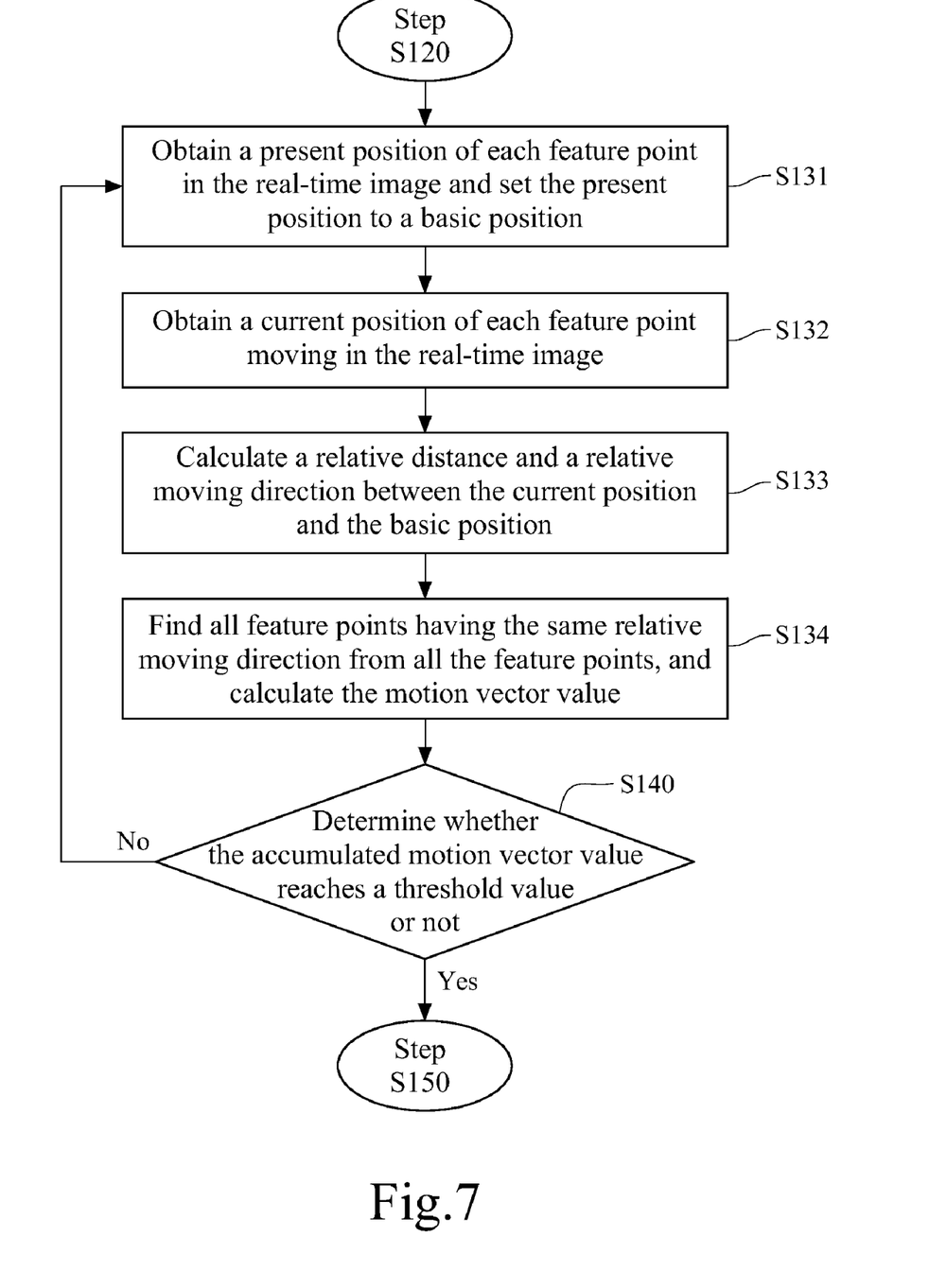
FIG. 7 is a flow chart of the step of calculating and accumulating a motion vector value of the feature point in a real-time image according to the embodiment of the present invention.

Referring to FIG. 7, in a preferred method embodiment, Steps S130 to S140 further comprise the following steps.

In Step S131, a present position of each feature point 18 in the real-time image 16 is obtained and set to a basic position.

Figure 8:
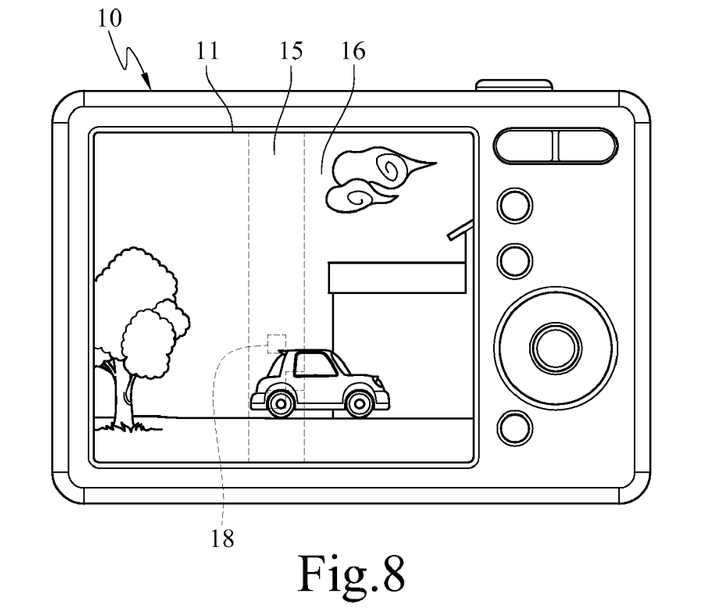
FIG. 8 is a first schematic view of the step of calculating the motion vector value of the feature point in the real-time image according to the embodiment of the present invention.
Figure 9:
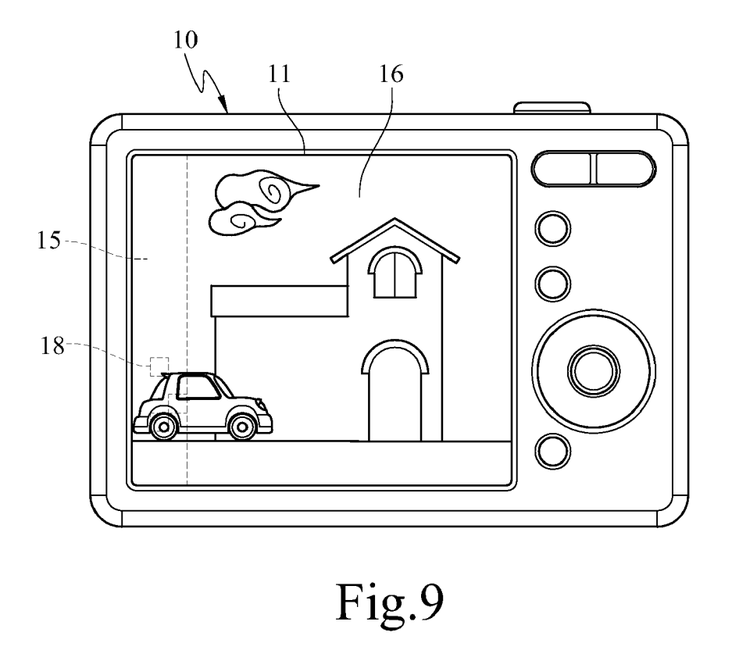
FIG. 9 is a second schematic view of the step of calculating the motion vector value of the feature point in the real-time image according to the embodiment of the present invention.

In Step S132, when the digital camera 10 begins to move such that the real-time image 16 is continuously changed, the digital camera 10 continuously obtains a current position of each feature point 18 in each frame of the real-time image 16 (referring to FIGS. 8 and 9).

In Step S133, a relative distance and a relative moving direction between the current position and the basic position of each feature point 18 are calculated.

In Step S134, all feature points 18 having the same relative moving direction are found from all the feature points 18, and the motion vector value is calculated in a statistic manner.

In Step S140, it is determined whether the accumulated motion vector value reaches the preset threshold value or not, if not, Steps S130 to S140 are repeated.

The above statistic manner is an aggregation and averaging manner, through which the motion vectors of all feature points 18 having the same relative moving direction are aggregated and then averaged to serve as the accumulated motion vector value for comparing with the threshold value. However, various statistic manners may be adopted, and the details will not be described herein. Those skilled in the art may select other manners of calculation, and the present invention is not limited to this.

It should be noted that when the relative moving direction of the feature point 18 is opposite to the relative moving direction of the previous image, the relative distance between the basic position and the current position is a negative value, so as to reduce the accumulated motion vector value.

The above relative distance is calculated as the number of pixels in a straight line between the basic position of the feature point 18 of the alignment image 15 at the previous image and the current position of the feature point 18 of the alignment image 15 at the next image.

Figure 10:
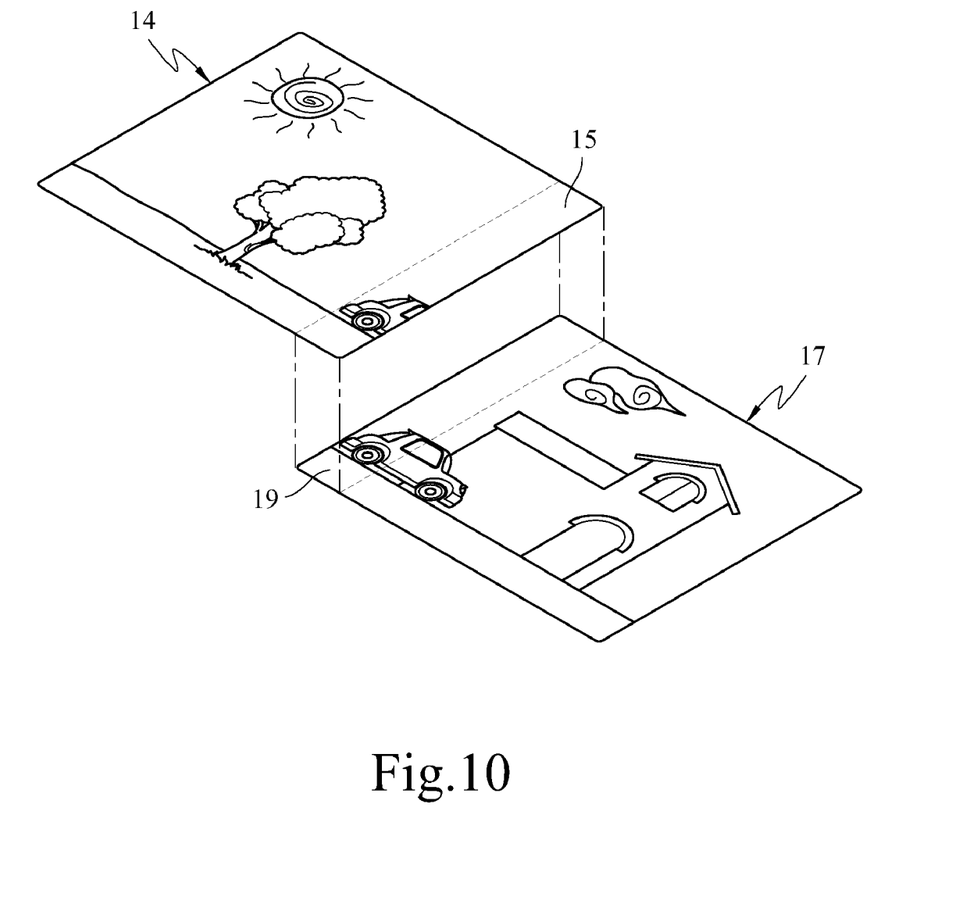
FIG. 10 is a schematic view of the step of stitching and blending the first image and the second image according to an embodiment of the present invention.
Figure 11:
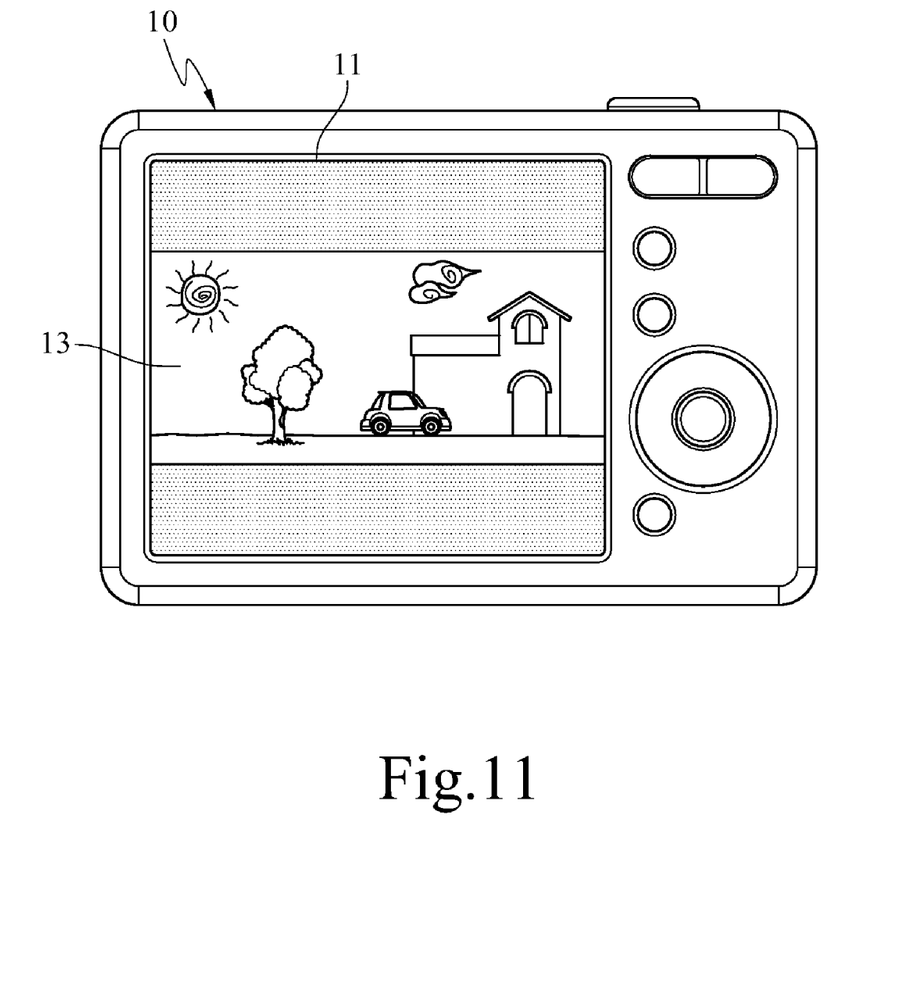
FIG. 11 is a schematic view of the panoramic image according to the embodiment of the present invention.

FIG. 10 is a schematic view of the step of stitching and blending the first image and the second image according to this embodiment, and FIG. 11 is a schematic view of the panoramic image according to this embodiment.

In Step S150, when the accumulated motion vector value reaches the preset threshold value, the digital camera 10 immediately captures the real-time image 16 displayed on the display screen 11 to serve as the second image 17.

In Step S160, one side of the captured second image 17 has a joining image 19 that is the same as the alignment image 15, and the digital camera 10 overlaps the alignment image 15 in the first image 14 and the joining image 19 in the second image 17, so as to stitch and blend the first image 14 and the second image 17 to obtain a panoramic image 13.

Figure 12:
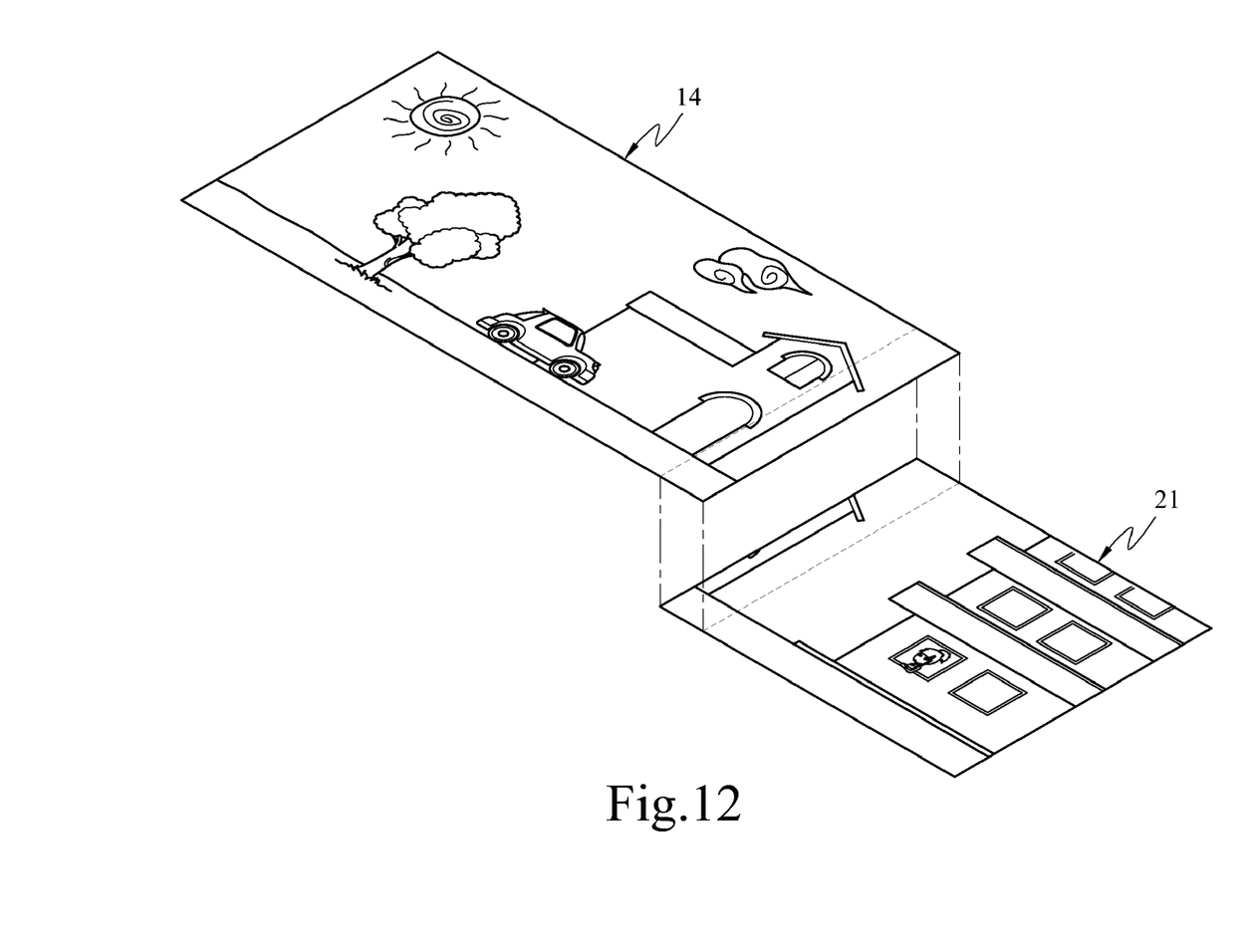
FIG. 12 is a schematic view of the step of stitching and blending the panoramic image and a third image according to the embodiment of the present invention.

Referring to FIG. 12, it should be noted that the present invention is not limited to stitching and blending two images. If the user intends to further stitch and blend a third image 21 or obtain a panoramic image having a viewing angle of 360° after stitching and blending the first image 14 and the second image 17, the image required by the user can be simply obtained by repeatedly performing the step of setting the stitched and blended image to the first image 14 and Steps S120 to S160.

As compared with the prior art, the automatic panoramic image capturing method of a digital camera of the present invention can simplify the operations for capturing the panoramic image by the user and increase the alignment accuracy. Through the automatic image capture mode, the user does not need to manually depress the shutter, thus alleviating the problem of failing to capture the panoramic image due to handshake.

What is claimed is:

1. An automatic capturing method of a panoramic image for a digital camera, applicable to a digital camera, the automatic capturing method comprising:
    capturing a first image;
    selecting a region from the first image and setting the region to an alignment image, wherein the selecting step comprises:
        obtaining a maximum width of the first image;
        defining a width of the alignment image according to a preset ratio and the maximum width;
        selecting the alignment image from the first image according to the width;
        dividing the alignment image into a plurality of regions;
        calculating an image standard deviation of each of the regions, and comparing the image standard deviation with a preset feature value; and
        selecting a feature point from the region with the image standard deviation greater than the feature value;
    continuously tracking and calculating a motion vector value of the alignment image in a real-time image, and accumulating the motion vector value to obtain an accumulated motion vector value;
    determining whether the accumulated motion vector value reaches a preset threshold value or not;
    if yes, automatically capturing a second image by the digital camera; and
    stitching and blending the first image and the second image to obtain a panoramic image.

2. The automatic capturing method of a panoramic image for a digital camera according to claim 1, wherein the step of continuously tracking and calculating the motion vector value of the alignment image in the real-time image, and accumulating the motion vector value to obtain the accumulated motion vector value comprises repeatedly performing the following steps:
    obtaining a basic position of the feature point in the real-time image;
    obtaining a current position of the feature point in the real-time image; and
    calculating a relative distance and a relative moving direction between the basic position and the current position, and accumulating the distances to obtain the motion vector value, and the result of accumulated defined the accumulated motion vector value.

3. The automatic capturing method of a panoramic image for a digital camera according to claim 1, wherein the preset threshold value is a difference between the maximum width of the first image and the width of the alignment image.

4. The automatic capturing method of a panoramic image for a digital camera according to claim 1, wherein after the step of determining whether the accumulated motion vector value reaches the preset threshold value or not, the method comprises:
    if not, continuously tracking and calculating the motion vector value of the alignment image in the real-time image, and accumulating the motion vector values.

* * * * *